(12) United States Patent
Yu

(10) Patent No.: US 7,876,687 B2
(45) Date of Patent: Jan. 25, 2011

(54) METHOD FOR MEASURING THE AVAILABLE BANDWIDTHS OF A LINK AND A NETWORK

(75) Inventor: Shunzheng Yu, Guangdong (CN)

(73) Assignee: Sun Yat-Sen University, Guangdong (CN)

( * ) Notice: Subject to any disclaimer, the term of this patent is extended or adjusted under 35 U.S.C. 154(b) by 211 days.

(21) Appl. No.: 12/162,485

(22) PCT Filed: Feb. 9, 2007

(86) PCT No.: PCT/CN2007/000452

§ 371 (c)(1),
(2), (4) Date: Jul. 29, 2008

(87) PCT Pub. No.: WO2008/031300

PCT Pub. Date: Mar. 20, 2008

(65) Prior Publication Data

US 2009/0016238 A1    Jan. 15, 2009

(30) Foreign Application Priority Data

Sep. 8, 2006    (CN) .................... 2006 1 0037599

(51) Int. Cl.
*H01R 31/08* (2006.01)
(52) U.S. Cl. ....................... 370/236; 370/252
(58) Field of Classification Search ................ 370/253, 370/236, 252
See application file for complete search history.

(56) References Cited

U.S. PATENT DOCUMENTS

2005/0232227 A1* 10/2005 Jorgenson et al. ........... 370/351

OTHER PUBLICATIONS

Attila Pasztor and Darryl Veitch, Active Probing using Packet Quartets, 2002 ACM ISBN 1-58113-X/02/0011.*

* cited by examiner

*Primary Examiner*—Donald L Mills
*Assistant Examiner*—Sai-Ming Chan

(57) ABSTRACT

The present invention provides a method for measuring the available bandwidth of a link and a method for measuring the available bandwidth of a network. By sending quartets in pair and measuring intervals of probe packets at the probe receiving end, the available bandwidth of any link in a network can be measured and the characteristics of load changes in a given link can be tracked and analyzed. Or, the available bandwidths of a network within given sources and destinations can be measured and the input/output bandwidth of the network or the changes in cross traffic can be found out. The present invention can be applied to trouble shooting in links and networks, capacity planning, QoS (Quality of Service) control or QoS service level agreement verification, load balancing, re-route and detection and mitigation of network attacks and in many other fields. It can also be used for measuring the available bandwidth of a path even if there is more than one link of the minimum capacity on the path or when the link of the minimum capacity is not the link of the minimum available bandwidth.

3 Claims, 2 Drawing Sheets

METHOD FOR MEASURING THE AVAILABLE BANDWIDTHS OF A LINK AND A NETWORK

BACKGROUND OF THE INVENTION

The present invention relates to the field of network measurement technology and more particularly pertains to a method for measuring the available bandwidths of a link and a network.

Existing network measurement technology only provides methods for measuring the available bandwidth of a network path. The prior art does not provide any methods for measuring the available bandwidths of a link and a network.

BRIEF SUMMARY OF THE INVENTION

In view of the aforesaid disadvantages now present in the prior art, the object of the present invention is to provide a method for measuring the available bandwidths of links and networks.

To attain the object, the present invention adopts the following technical proposal:

A method for measuring the available bandwidth of a link comprising sending a series of probe packets from a probe sending end and receiving the probe packets by a probe receiving end to measure the available bandwidth $A_k$ of any link $L_k$ in a network; each eight probe packets form a group and each group is composed of a pair of quartets; each quartet is composed of four probe packets which are sent back-to-back as denoted by p, m, q, m in accordance with their sending sequence with their packet sizes as denoted by s(p), s(m), s(q) and s(m) in bits correspondingly; the probe packets m are denoted by $m_1$, $m_2$, $m_3$ and $m_4$ in accordance with the sending sequence of the eight probe packets of the group; the arrival times of $m_1$, $m_2$, $m_3$, $m_4$ as denoted by $t(m_1)$, $t(m_2)$, $t(m_3)$, $t(m_4)$ are measured at the probe receiving end; and the mean values of their arrival time intervals as denoted by $\Delta_1 = E\{t(m_2)-t(m_1)\}$, $\Delta_2 = E\{t(m_3)-t(m_2)\}$, $\Delta_3 = E\{t(m_4)-t(m_3)\}$ are calculated; the available bandwidth $A_k$ of the link $L_k$ is then estimated according to the following equation:

$$\hat{A}_k = C_k - \frac{\Delta_3 C_k - (s(q)+s(m))}{\Delta_1},$$

wherein $C_k$ is a given link capacity.

The time interval T between any two consecutive quartets sent takes a value sufficiently large to provide a lower probability for the two quartets to have packets to appear concurrently in the same router before they reach the measured link $L_k$.

The probe packet m takes the TTL (Time-To-Live) value of 255; when the link to-be-measured is the $k^{th}$ link from the probe sending end, the probe packets p and q of the quartet sent earlier take the TTL values of k−1 and the probe packets p and q of the quartet subsequently sent take the TTL values of k.

The values of s(p), s(q), s(m) have to satisfy a back-to-back condition, namely, given that the link capacities from the probe sending end to the link to-be-measured are in sequence of $C_1, C_2, \ldots, C_k$; calculate $C_{i_1} = \min\{C_1, C_2, \ldots, C_k\}$, $C_{i_2} = \min\{C_{i_1+1}, \ldots, C_k\}$, $\ldots$, $C_{i_j} = \min\{C_{i_{j-1}+1}, \ldots, C_k\} = C_k$; then calculate $$\alpha = \max\left\{\frac{C_{i_1}}{C_k}, \frac{C_{i_2}}{C_{i_1}}, \frac{C_{i_3}}{C_{i_2}}, \ldots, \frac{C_{i_j}}{C_{i_{j-1}}}\right\};$$

then obtaining the following equations for the back-to-back condition:

$$\frac{s(p)}{s(m)} \geq \alpha, \quad \frac{s(p)+s(m)}{s(m)+s(q)} \geq \alpha, \quad \frac{s(p)+s(m)+s(q)}{s(q)+2s(m)} \geq \alpha,$$

wherein the default value of $\alpha$ is $\alpha=10$.

In the present invention, s(p) takes a value which is the maximum transmission unit (MTU) of the path, s(m) takes a value which is the minimum transmission unit of the path, and specifically on the path of Ethernet link s(p)=1518 Byte, s(m)=64 Byte, s(q) takes a value according to the following equation:

$$s(q) \leq \min\left\{\frac{s(p)+s(m)}{\alpha} - s(m), \frac{s(p)+(1-2\alpha)s(m)}{\alpha-1}\right\}.$$

By means of measuring the available bandwidths of all links in a network to-be-measured, the present invention can be applied for measuring the available bandwidth of the network to-be-measured; or by means of measuring the total available bandwidths of all links in the minimum capacity cut-set or the minimum available bandwidth cut-set of the network to-be-measured, the present invention can be applied to determine the upper bound of the available bandwidth of the network to-be-measured; and when the network to-be-measured is a path, the method for measuring the available bandwidth of a network is simplified as a method for measuring the available bandwidth of a path.

The advantages of the invention are: By means of measuring the available bandwidth of any given link in a network, it can accurately track and analyze the characteristics of load changes in the given link. By measuring the available bandwidths of a network with given sources and destinations, it can find out the input/output bandwidth of the network or the changes in cross traffic that is traversing across the input/output bottleneck of the network but is not originating from the given sources and destining to the given destinations. Therefore, the present invention can be applied to trouble shooting in links and networks, capacity planning, QoS (Quality of Service) control or QoS service level agreement (SLA) verification, load balancing, re-route and detection and mitigation of network attacks and in many other fields. The present invention can also be used for measuring the available bandwidth of a path and its measurement accuracy is higher than those of the classical methods for measuring the available bandwidth of a path. In particular, when the classical methods for measuring the available bandwidth of a path are not applicable in the circumstances, that is, when there is more than one link of the minimum capacity on the path or when the link of the minimum capacity is not the link of the minimum available bandwidth, the present invention can still attain low measurement errors.

The present invention can also be used for measuring the link capacity $C_k$ or both the link capacity and the link available bandwidth.

DETAILED DESCRIPTION OF THE INVENTION

The preferred embodiment of the present invention is further described in detail with the following embodiment and the accompanying drawings.

Figure 1:
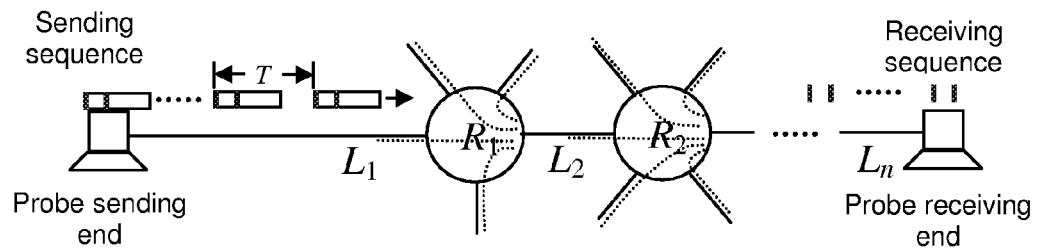
FIG. 1 is a diagram of the system architecture of the present invention.

FIG. 1 is a diagram of the system architecture illustrating the method for measuring the available bandwidth of a link. It is used for measuring the available bandwidth of any link in a network as well as its capacity and utilization rate, or for measuring the available bandwidth of a path, or for measuring the available bandwidth of a network. In this embodiment, a series of quartets is sent out in pair from the probe sending end within a given time period. When each quartet passes through each individual link $L_1, L_2, \ldots, L_n$ and each individual router $R_1, R_2, \ldots, R_{n-1}$, time delays are caused and time intervals between probe packets are changed, wherein the transmission time delays are determined by the capacity of each link $C_1, C_2, \ldots, C_n$, the queuing time delays are determined by the background traffic passing through each link. The probe receiving end conducts statistical analyses of time intervals between probe packets and estimates the available bandwidth with respect to a link or a path or a network to-be-measured.

The time required for each measurement by the system may vary depending on the requirements for accuracy. However, the longest time cannot exceed the stability time of traffic in a network such as several tens of minutes; the shortest cannot be less than the time for collecting enough number of samples as required for measurement of accuracy. Experiments demonstrate that several seconds of statistical measurement time can speedily and roughly estimate the available bandwidth; ten seconds or more of statistical measurement time can have results close to the accuracy level of the typical prior art; several tens of seconds of statistical measurement time can attain a very good comprehensive effect on measurement accuracy, measurement consistency, measurement loading and so forth. In general, longer statistical measurement time cannot obviously improve the measurement effect.

In a statistical measurement time period, a series of probe quartets is sent out in group from a probe sending end. Each group is composed of two or more quartets according to a given method. The time interval T between any two consecutive quartets (that is, the time interval between the last byte of each quartet) has to take a sufficiently large value, that is, greater than the queuing time delay on a measured path, so as to ensure the last probe packet of the first quartet and the first probe packet of the successive quartet do not appear concurrently in the same router on a path. However, for the pair of quartets to reveal the same state of network load changes and to increase the accuracy level of the measurement, the value of T is not preferred to be excessively great. For example, let T be 10 times greater than the transmission time of a quartet, and when the bottleneck link on the path is 10 Mbps and the total bytes of a quartet is 3100 Byte, $T \approx 24$ ms.

Figure 2:
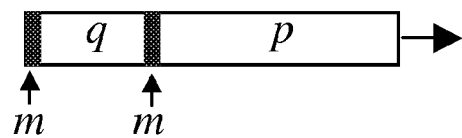
FIG. 2 is a schematic diagram showing a quartet composed of four probe packets.

The quartet which is composed of four probe packets is a basic unit employed in the method for measuring the available bandwidth of the present invention. It is sent from the sending end in a back-to-back mode and its construction is shown in FIG. 2. In this embodiment, s(p) takes a value as great as possible such as on the path of Ethernet link s(p)=1518 Byte, s(m) takes a value as small as possible such as on the path of Ethernet link s(m)=64 Byte; and given the values of s(p) and s(m), s(q) takes a value that can satisfy the back-to-back condition. p and q take smaller TTL values so that they can be discarded in a given router whereas m takes a TTL value as great as possible such as 255 so that m can carry interval information to a probe receiving end.

Figure 3:
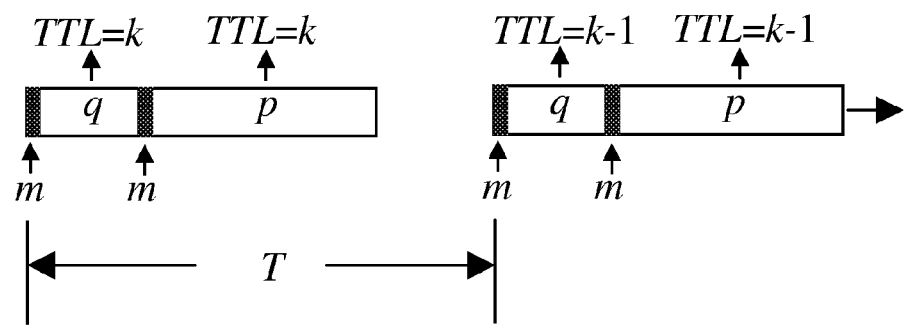
FIG. 3 is a schematic diagram showing a pair of quartets.
Figure 4:
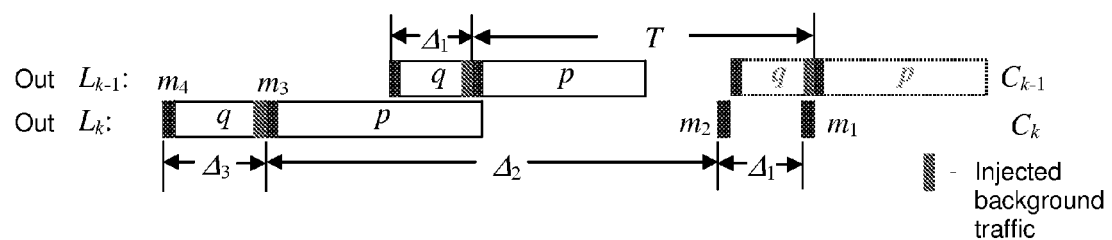
FIG. 4 is a schematic diagram showing the time correlation when a pair of quartets departs from links $L_{k-1}$ and $L_k$.

I. Method for Measuring the Available Bandwidth of a Link:

In measuring a given link, every two quartets form one pair and the construction of each pair is shown in FIG. 3. In this embodiment, let the link to-be-measured $L_k$ be the $k^{th}$ link from the probe sending end; p and q of the quartet sent earlier take the TTL values of k−1 and p and q of the quartet subsequently sent take the TTL values of k. FIG. 4 shows the time correlation when the pair of quartets departs from links $L_{k-1}$ and $L_k$.

To satisfy the condition that when there is no background traffic on the path, all the probe packets in the quartet subsequently sent continue to be in a back-to-back mode when departing from the link to-be-measured $L_k$, the packet sizes of the probe packets in the quartet have to satisfy the following back-to-back condition: Given that the link capacities from the probe sending end to the link to-be-measured are in sequence of $C_1, C_2, \ldots, C_k$;

(1) Calculate the minimum capacity $C_{i_1} = \min\{C_1, C_2, \ldots, C_k\}$, $C_{i_2} = \min\{C_{i_1+1}, C_k\}, \ldots, C_{i_j} = \min\{C_{i_{j-1}+1}, \ldots, C_k\} = C_k$;

(2) Calculate the back-to-back factor $$\alpha = \max\left\{\frac{C_{i_1}}{C_k}, \frac{C_{i_2}}{C_{i_1}}, \frac{C_{i_3}}{C_{i_2}}, \ldots, \frac{C_{i_j}}{C_{i_{j-1}}}\right\};$$

(3) Wherein s(p) and s(m) are given, calculate according to the following equation the back-to-back condition which s(q) has to satisfy:

$$s(q) \leq \min\left\{\frac{s(p)+s(m)}{\alpha} - s(m), \frac{s(p)+(1-2\alpha)s(m)}{\alpha-1}\right\}.$$

In order to allow more background traffic to be injected in between the probe packets so as to obtain background traffic information, s(q) takes a value as great as possible, that is, the largest value $s(q)_{max}$ as derived from the above equation. However, in order to allow the probe packet q to keep following its leading probe packet p properly despite the influence of the background traffic, s(q) takes a value as small as possible. For example, let $s(q) = 0.8\, s(q)_{max}$ and it can be expected to have better measurement effect. When s(p)=1518B, s(m)=64B, the correlation between the value of $s(q)_{max}$ (after considering the smallest packet size) and the back-to-back factor $\alpha$ is set out as below:

| α | 1 | 2 | 3 | 4 | 5 | 6 | 7 | 8 | 9 | 10 | 11 | 12 |
|---|---|---|---|---|---|---|---|---|---|----|----|----|
| $s(q)_{max}$ | 1518B | 727B | 463B | 331B | 235B | 162B | 114B | 79B | 64B | 64B | 64B | 64B |

When the value of α is unknown, according to the existing Internet technology it can be selected as α=10 so as to satisfy the requirement of measuring the available bandwidth of the link from 10 Mbps edge router to 100 Mbps core router, or from 100 Mbps router to 1 Gbps router, or from 1 Gbps router to 10 Gbps router. The arrival time $t(m_1)$, $t(m_2)$, $t(m_3)$, $t(m_4)$ of $m_1$, $m_2$, $m_3$, $m_4$ is measured at the probe receiving end; and the mean values of their inter-arrival times are statistically calculated as: $\Delta_1 = E\{t(m_2)-t(m_1)\}$, $\Delta_2 = E\{t(m_3)-t(m_2)\}$, $\Delta_3 = E\{t(m_4)-t(m_3)\}$; then, by making use of the time correlation as shown in FIG. 4, the following equation is used to estimate the utilization rate $u_k$ and the available bandwidth $A_k$ of the link:

$$\hat{u}_k = \frac{\Delta_3 - (s(q) + s(m))/C_k}{\Delta_1},$$

$$\hat{A}_k = (1 - \hat{u}_k)C_k$$

wherein $C_k$ is known.

II. Method for Measuring the Link Capacity:

When $C_k$ is unknown, it can be estimated by adopting the method of the present invention according to the following equation:

$$\hat{C}_k = \frac{s(p)}{\Delta_2 + \Delta_1 - T + s(m)/C_{k-1}} \approx \frac{s(p)}{\Delta_2 + \Delta_1 - T}\left(1 - \frac{s(m)}{s(q)}\alpha\right)$$

It can also be estimated by adopting the method of the present invention where T and s(m) are kept constant, and by varying the packet size of the probe packet p, that is, the value of s(p), and then making use of the equation $$\frac{s(p)}{C_k} = \Delta_2 + \Delta_1 - T + \frac{s(m)}{C_{k-1}},$$

it can accurately estimate the link capacity $C_k$, wherein $$-T + \frac{s(m)}{C_{k-1}}$$

is a value which does not relate to s(p), and thus $$\hat{C}_k = \frac{d[s(p)]}{d[\Delta_2 + \Delta_1]}.$$

Figure 5:
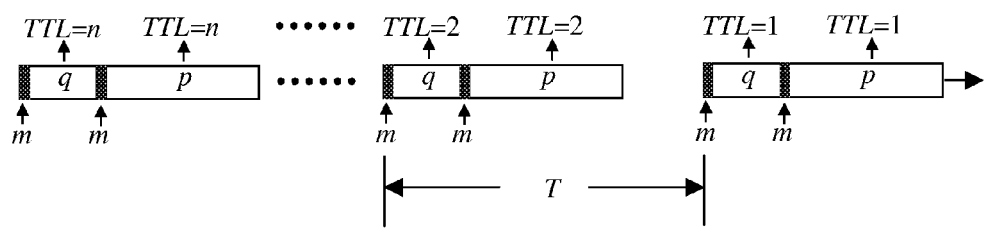
FIG. 5 is a schematic diagram showing a measurement method with a group of n quartets.

III. Method for Measuring the Available Bandwidth of a Path:

When measuring a given path and if the path contains n links, then take n quartets in sequence as a measurement group, and its construction is shown in FIG. 5. The probe packets p and q of each quartet in the measurement group take the TTL values in accordance with the sending sequence, namely, 1, 2, . . . , n. s(q) takes a value which has to satisfy the back-to-back condition when $$\alpha = \max\left\{\frac{C_2}{C_1}, \frac{C_3}{C_2}, \ldots, \frac{C_n}{C_{n-1}}\right\}.$$

The probe receiving end conducts statistical analyses of the inter-arrival times of all neighboring probe packets to obtain the mean values, and estimates the available bandwidth of each link $A_k$ by applying the equation for calculating the available bandwidth of a link; and finally obtains the estimate value of the available bandwidth of a path $A_{path}$:

$$\hat{A}_{path} = \min_{1 \leq k \leq n} \hat{A}_k.$$

After determining the value of one or more links of the minimum available bandwidth on the path, one can apply the method for measuring the available bandwidth of a link to track and measure only these links so as to reduce the measuring costs.

IV. Method for Measuring the Available Bandwidth of a Network:

For a network to-be-measured with given one or more sources and destinations, it is first to determine the number of paths so as to include all its links. Next, apply the method for measuring the available bandwidth of a path to measure each path so as to determine the available bandwidths of all links of each path. Finally, take the max-flow min-cut algorithm to determine the available bandwidth of the network to-be-measured.

With a view to reducing the measuring costs, the following method can be applied to estimate the upper bound of the available bandwidth of a network:

(1) First make use of the max-flow min-cut algorithm to determine all the minimum capacity cut-sets of the network to-be-measured, or after measuring the available bandwidths of all links in the network to-be-measured, determine the minimum available bandwidth cut-sets of the network to-be-measured;

(2) For all links of all the minimum cut-sets, apply the method for measuring the available bandwidth of a link to measure their available bandwidths individually;

(3) Take the sum of the available bandwidths of all links of each minimum cut-set as the available bandwidth of that cut-set; and (4) Take the minimum value of the available bandwidths of all cut-sets as the estimate of the upper bound value of the available bandwidth of the network to-be-measured.

What is claimed is:

1. A method for measuring the available bandwidth of a link comprising:

sending a series of probe packets to measure the available bandwidth $A_k$ of any link $L_k$ in a network; each eight probe packets form a group and each group is composed of a pair of quartets; each quartet is composed of four back-to-back probe packets p, m, q, m and their packet sizes are s(p), s(m), s(q) and s(m) correspondingly; the probe packets m are denoted by $m_1$, $m_2$, $m_3$ and $m_4$ in accordance with the sending sequence of the eight probe packets of the group; at the probe sending end the time intervals of sending the quartets in the series are greater than the queuing time delays on the measured path, thereby enabling any two packets of any two consecutive quartets shall not concurrently appear on the same router; the four probe packets in each of the quartets are sent back-to-back; the probe packet m takes the TTL value of 255; when the link to-be-measured is the $k^{th}$ link from the probe sending end, p and q of the quartet sent earlier take the TTL values of k−1 and p and q of the quartet subsequently sent take the TTL values of k; the arrival times of $m_1$, $m_2$, $m_3$, $m_4$ as denoted by $t(m_1)$, $t(m_2)$, $t(m_3)$, $t(m_4)$ are measured at the probe receiving end; and the mean values of their arrival time intervals as denoted by $\Delta_1 = E\{t(m_2)-t(m_1)\}$, $\Delta_2 = E\{t(m_3)-t(m_2)\}$, $\Delta_3 = E\{t(m_4)-t(m_3)\}$ are calculated: the available bandwidth $A_k$ the link $L_k$ is then estimated according to the following equation:

$$\hat{A}_k = C_k - \frac{\Delta_3 C_k - (s(q)+s(m))}{\Delta_1},$$

wherein $C_k$ is a given link capacity.

2. The method for measuring the available bandwidth of a link as in claim 1, wherein the values of s(p), s(q), s(m) have to satisfy a back-to-back condition, namely, given that the link capacities from the probe sending end to the link to-be-measured are in sequence of $C_1, C_2, \ldots, C_k$; calculate $C_{i_1} = \min\{C_1, C_2, \ldots, C_k\}$, $C_{i_2} = \min\{C_{i_1+1}, \ldots, C_k\}$, $\ldots$, $C_{i_j} = \min\{C_{i_{j-1}+1}, \ldots, C_k\} = C_k$; then calculate $$\alpha = \max\left\{\frac{C_{i_1}}{C_k}, \frac{C_{i_2}}{C_{i_1}}, \frac{C_{i_3}}{C_{i_2}}, \ldots, \frac{C_{i_j}}{C_{i_{j-1}}}\right\};$$

then obtaining the following equations for the back-to-back condition:

$$: \frac{s(p)}{s(m)} \geq \alpha, \frac{s(p)+s(m)}{s(m)+s(q)} \geq \alpha, \frac{s(p)+s(m)+s(q)}{s(q)+2s(m)} \geq \alpha,$$

wherein the default value of $\alpha$ is $\alpha = 10$.

3. The method for measuring the available bandwidth of a link as in claim 2, wherein s(p) takes a value which is the maximum transmission unit (MTU) of the path, s(m) takes a value which is the minimum transmission unit of the path, s(q) takes a value according to the following equation:

$$s(q) \leq \min\left\{\frac{s(p)+s(m)}{\alpha} - s(m), \frac{s(p)+(1-2\alpha)s(m)}{\alpha-1}\right\}.$$

* * * * *